(12) United States Patent
Hardee (10) Patent No.: US 7,247,229 B2
(45) Date of Patent: Jul. 24, 2007

(54) COATINGS FOR THE INHIBITION OF UNDESIRABLE OXIDATION IN AN ELECTROCHEMICAL CELL

(75) Inventor: Kenneth I Hardee, Middlefield, OH (US)

(73) Assignee: ELTECH Systems Corporation, Chardon, OH (US)

( * ) Notice: Subject to any disclaimer, the term of this patent is extended or adjusted under 35 U.S.C. 154(b) by 79 days.

(21) Appl. No.: 10/274,321

(22) Filed: Oct. 18, 2002

(65) Prior Publication Data

US 2004/0031692 A1  Feb. 19, 2004

Related U.S. Application Data

(63) Continuation-in-part of application No. 09/599,339, filed on Jun. 22, 2000, now Pat. No. 6,527,939.

(60) Provisional application No. 60/141,299, filed on Jun. 28, 1999.

(51) Int. Cl.
| | |
|---|---|
| C25B 1/04 | (2006.01) |
| C25B 1/46 | (2006.01) |
| C25B 1/26 | (2006.01) |
| C25C 1/12 | (2006.01) |
| C25C 1/00 | (2006.01) |
| C25D 3/04 | (2006.01) |
| C25D 3/38 | (2006.01) |
| C25D 3/30 | (2006.01) |
| C23F 13/00 | (2006.01) |
| C25B 11/10 | (2006.01) |
| C25C 7/02 | (2006.01) |
| C25D 17/10 | (2006.01) |

(52) U.S. Cl. ............ 205/292; 205/272; 205/300; 205/535; 205/500; 205/630; 205/738; 205/284; 205/759

(58) Field of Classification Search ............... 205/111, 205/112, 113, 316, 322, 324, 325, 333, 210, 205/213, 214, 224
See application file for complete search history.

(56) References Cited

U.S. PATENT DOCUMENTS

| | | | | |
|---|---|---|---|---|
| 2,972,572 | A * | 2/1961 | Cope Jr. et al. | 205/298 |
| 3,267,010 | A * | 8/1966 | Hans-Gerhard Creutz et al. | 205/298 |
| 3,657,102 | A | 4/1972 | Keith et al. | |
| 3,711,397 | A * | 1/1973 | Martinsons | 205/474 |
| 3,773,554 | A | 11/1973 | Scrutton et al. | |
| 3,869,312 | A | 3/1975 | Moss et al. | |
| 3,940,323 | A * | 2/1976 | Cook, Jr. | 205/505 |
| 4,005,003 | A * | 1/1977 | Popplewell et al. | 204/290.09 |
| 4,310,391 | A | 1/1982 | Okinaka et al. | |
| 4,411,761 | A * | 10/1983 | Roos et al. | 204/290.01 |
| 4,517,068 | A | 5/1985 | Hinden et al. | |
| 5,006,321 | A * | 4/1991 | Dorfman et al. | 427/192 |
| 5,156,726 | A * | 10/1992 | Nakada et al. | 204/290.09 |
| 5,407,556 | A * | 4/1995 | Shimada et al. | 205/77 |
| 6,251,254 | B1 | 6/2001 | Katoh et al. | |
| 6,527,939 | B1 * | 3/2003 | Hardee | 205/292 |

FOREIGN PATENT DOCUMENTS

JP  02213470  8/1990

* cited by examiner

*Primary Examiner*—Harry D. Wilkins, III
(74) *Attorney, Agent, or Firm*—Eschweiler & Associates, LLC (57) ABSTRACT

A process for electroplating of metal utilizing a valve metal electrode substrate containing multiple coating layers is disclosed. A top coating layer of a valve metal oxide is applied over a first coating layer of an electrochemically active coating. The electrode may find use in an electroplating system containing organic substituents in which the consumption of the organic substituent is significantly decreased or in systems where it is desirable to suppress the oxidation of a species in an electrochemical cell.

29 Claims, 2 Drawing Sheets

COATINGS FOR THE INHIBITION OF UNDESIRABLE OXIDATION IN AN ELECTROCHEMICAL CELL

CROSS REFERENCE TO RELATED APPLICATION

This application is a continuation-in-part of related application Ser. No. 09/599,339, filed Jun. 22, 2000, now U.S. Pat. No. 6,527,939, which claims the benefit of Provisional Application 60/141,299 filed Jun. 28, 1999.

BACKGROUND OF THE INVENTION

I. Field of the Invention

The invention is directed to a process for electroplating of metal utilizing an electrode containing multiple coating layers. The electrode may find use in an electroplating system containing organic substituents in which the consumption of the organic substituent is significantly decreased or in systems where it is desirable to suppress the oxidation of a species in an electrochemical cell.

II. Description of the Related Art

In traditional plating systems, anodes are utilized which are fabricated from the same metal being plated. Known as "soluble" anodes in the industry, the anodes supply both the electrical current and replenish the electrolyte with the metal ions being plated.

In order to improve the current plating technology, by increasing current density and modifying cell design, the use of insoluble anodes has been substituted for the traditional soluble anode. These insoluble anodes, also known as dimensionally stable anodes, such as coated titanium anodes, however, significantly increase the consumption of the organic constituents added to the electrolyte. Such disadvantages affect the plating characteristics and cost effectiveness of the plating process.

In U.S. Pat. No. 6,251,254, there is taught an electrode adapted for chromium plating from trivalent chromium baths. The electrode comprises a conductive base, an electrode material layer of iridium oxide thereon, and a porous oxide layer of silicon, molybdenum, titanium, tantalum, zirconium or tungsten formed on the surface of the electrode material layer.

U.S. Pat. No. 4,310,391 to Okinaka, et al, teaches an electrode structure useful as a counter electrode in gold plating which exhibits long life and reduced undesirable side reactions in the gold plating process, including reduction in the consumption of buffer material and formation of trivalent gold. The electrode surface consists of a coating mixture of oxides of certain group eight elements and oxides of certain valve metals.

It would be desirable, however, to provide an anode for an electroplating system containing organic constituents, which does not significantly decrease the amount of organic constituent lost via oxidation in the system. It would also be desirable to provide an anode for electrochemical processes where there is a need to minimize the oxidation of an oxidizable species in solutions. For example, inhibiting the oxidation of chloride in systems with low levels of chloride to minimize the production of chlorine and/or hypochlorite, which may be undesirable byproducts.

SUMMARY OF THE INVENTION

The present invention is directed to an electrode and methods for its use, and more specifically, to anodes, having an electrocatalytic coating as a surface coating layer, and a topcoating layer thereon. The topcoating layer is formed from a ceramic material such as a valve metal oxide, tin oxide, or oxides of the type perovskite, garnet or spinel, and can be utilized to extend protection to the electrocatalytic coating layer in applications involving oxygen evolution. The topcoating layer can also afford protection to organic substituents or other oxidizable species in an electrolyte from oxidation in an electrochemical cell.

DETAILED DESCRIPTION OF THE INVENTION

For the electrode having multiple coating layers, the base of a valve metal can be such metal including titanium, tantalum, zirconium, niobium, aluminum, and tungsten. Of particular interest for its ruggedness, corrosion resistance and availability is titanium. As well as the normally available elemental metals themselves, the suitable metals of the electrode base can include metal alloys and intermetallic mixtures, as well as ceramics and cermets such as contain one or more valve metals. For example, titanium may be alloyed with nickel, cobalt, iron, manganese or copper. More specifically, grade 5 titanium may include up to 6.75 weight percent aluminum and 4.5 weight percent vanadium, grade 6 up to 6 percent aluminum and 3 percent tin, grade 7 up to 0.25 weight percent palladium, grade 10, from 10 to 13 weight percent plus 4.5 to 7.5 weight percent zirconium and so on.

By use of elemental metals, it is most particularly meant the metals in their normally available condition, i.e., having minor amounts of impurities. Thus, for the metal of particular interest, i.e., titanium, various grades of the metal are available including those in which other constituents may be alloys or alloys plus impurities. Grades of titanium have been more specifically set forth in the standard specifications for titanium detailed in ASTM B 265-79.

The electrode base may take various forms, i.e., any of those forms that may be used for the deposition of metal, and including mesh, sheet, blades, tubes or wire form.

Regardless of the metal selected and the form of the anode base member, the surface of such substrate member advantageously is a cleaned surface. This may be obtained by any of the known treatments used to achieve a clean metal surface.

When a cleaned surface, or prepared and cleaned surface has been obtained, and particularly for applying the necessary coating layers which will be on the valve metal base, the base surface may be further treated for enhanced adhesion such as of the electrocatalytic coating layer to the valve metal. This will be achieved by means which include intergranular etching of the substrate metal, sharp grit blasting of the metal surface, followed by surface treatment to remove embedded grit, or plasma spraying.

To prepare a metal such as titanium for etching, it can be most useful to condition the metal, as by annealing, to diffuse impurities to the grain boundaries. Thus, by way of example, proper annealing of grade 1 titanium will enhance the concentration of the iron impurity at grain boundaries. Also for the aspect of etching, it can be desirable to combine a metal surface having a correct grain boundary metallurgy with an advantageous grain size. Again, referring to titanium as exemplary, at least a substantial amount of the grains having grain size number within the range of from about 3 to about 7 is advantageous. Grain size number as referred to herein is in accordance with the designation provided in ASTM E 112-84. A serviceable metal substrate of this condition has been disclosed in U.S. Pat. No. 5,167,788.

Etching will be with a sufficiently active etch solution. Typical etch solutions are acid solutions. These can be provided by hydrochloric, sulfuric, perchloric, nitric, oxalic, tartaric, and phosphoric acids as well as mixtures thereof, e.g., aqua regia. Other etchants that may be utilized include caustic etchants such as a solution of potassium hydroxide/hydrogen peroxide, or a melt of potassium hydroxide with potassium nitrate. Following etching, the etched metal surface can then be subjected to rinsing and drying steps.

It has also been found that a suitably roughened metal surface can be obtained by special grit blasting with sharp grit followed by removal of surface embedded grit. The grit, which will contain usually angular particles, will cut the metal surface as opposed to peening the surface. Serviceable grit for such purpose can include sand, aluminum oxide, steel and silicon carbide. Upon grit removal, this can provide a suitably roughened, three-dimensional surface. Etching, or other treatment such as water blasting, following grit blasting can remove embedded grit and provide the desirably roughened surface.

In plasma spraying for a suitably roughened metal surface, although the material will be applied in particulate form such as droplets of molten metal, the feed material, e.g., a metal to be applied, may be in different form such as wire form. This is to be understood even though for convenience, application will typically be discussed as material applied in particulate form. In this plasma spraying, such as it would apply to spraying of a metal, the metal is melted and sprayed in a plasma stream generated by heating with an electric arc to high temperatures in inert gas, such as argon or nitrogen, optionally containing a minor amount of hydrogen. It is to be understood by the use herein of the term "plasma spraying" that although plasma spraying is preferred the term is meant to include generally thermal spraying such as magnetohydrodynamic spraying, flame spraying and arc spraying, so that the spraying may simply be referred to as "melt spraying". A substrate of a plasma sprayed surface morphology that can find use herein has been disclosed in U.S. Pat. No. 5,324,407.

Application of a barrier layer can optionally be included following the obtaining of a suitably roughened surface. A melt-sprayed ceramic oxide roughened surface may also serve as a satisfactory barrier layer. Where surface roughening has not also provided a serviceable barrier layer, it is preferred for economy to form a suitable barrier layer on the metal substrate by heating the metal substrate in an oxygen-containing atmosphere. Roughened metal surfaces suitable for heat treatment will thus include grain boundary etched surfaces, those with sharp grit blasting with follow-up grit removal and surfaces having melt sprayed metal. Most always, this heat treatment will be used with a representative titanium metal substrate surface. Heating can be conducted in any oxygen-containing atmosphere, with air being preferred for economy. For the representative titanium metal surface, a serviceable temperature for this heating to obtain barrier layer formation will generally be within a range of in excess of 450° C. but less than about 700° C. It will be understood that such heat treatment at a temperature within this range in an oxygen containing atmosphere will form a surface oxide barrier layer on the metal substrate. For the representative titanium metal, the preferred temperature range for the oxygen atmosphere heating is from about 525° C. to about 650° C. Typically, the metal will be subject to such elevated temperature heating for a time of from about 15 minutes to about 2 hours or even more, preferred times for the representative titanium metal are within the range of from about 30 minutes to about 60 minutes. A wash solution of a doping agent may be used with this thermal treatment. Doping agents such as niobium chloride to provide niobium, or a tantalum or vanadium salt to provide such constituents in ionic form, can be present in the wash solution.

It is also contemplated the optional barrier layer can be effectively obtained on such surface using a suitable precursor substituent and thermal treatment to convert the precursor substituent to an oxide. Where this thermal decomposition treatment with precursor substituent will be used, for a representative titanium oxide barrier layer, suitable precursor substituents can be either organic or inorganic compositions. Organic precursor substituents include $TiCl_3$ or $TiCl_4$, usually in acid solution. Where tin oxide is the desired barrier layer constituent, suitable precursor substituents can include $SnCl_4$, $SnSO_4$, or other inorganic tin salts.

Such precursor substituent may be used with doping agents, such as those which would be incorporated as a doping agent precursor into the composition to increase the conductivity of the resulting barrier layer oxide. For example, a niobium salt may be used to provide a niobium doping agent in ion form in the oxide lattice. Other doping agents include ruthenium, iridium, platinum, rhodium and palladium, as well as mixtures of any of the doping agents. It has been known to use such doping agents for titanium oxide barrier layers. Doping agents suitable for tin oxide barrier layers include antimony, indium or fluorine.

The precursor substituent will suitably be a precursor solution or dispersion containing a dissolved or dispersed metal salt in liquid medium. Such composition can thus be applied to a suitably prepared surface by any usual method for coating a liquid composition onto a substrate, e.g., brush application, spray application including air or electrostatic spray, and dipping. In addition to dopants which may be present in the applied precursor composition, such composition might additionally contain other materials. These other materials may be particulates and such particulates can take the shape of fibers. The fibers may serve to enhance coating integrity or enhance the three-dimensional surface morphology. These fibers can be silica-based, for example, glass fibers, or may be other oxide fibers such as valve metal oxide fibers including titanium oxide and zirconium oxide fibers, and mixtures of the foregoing. In the coating composition, additional ingredients can include modifiers which will generally be contained in compositions containing precursor substituents to titanium oxides. Such modifiers are useful for minimizing any mud cracking of the barrier layer during the thermal treatment cycles.

For the thermal oxidation of the metal salts applied to the substrate, such will generally be conducted in an oxygen containing environment, preferably air for economy, at a temperature within the range of from greater than about 400° C. up to about 650° C. For efficient thermal conversion, a preferred temperature will be in the range of from about 500° C. to about 600° C. Where the coating is applied as a liquid medium, such thermal treatment will serviceably be observed after each applied coating with such temperature being maintained from about 1 minute to about 60 minutes per coat. Preferably, for efficiency and economy, the temperature will be maintained from about 3 to about 10 minutes per coat. The number of coating cycles can vary depending upon the required amount of barrier layer, with 5 to 40 coats being usual, although fewer coatings, and even a single coating, is contemplated.

Usually, the number of coats for a representative titanium oxide coating, such as formed by the thermal decomposition of titanium butyl orthotitanate, will not exceed on the order of about 20, and advantageously for economy plus efficient electrode lifetime, such will be less than 10 coats. The resulting amount of barrier layer will usually not exceed about 0.025 inch for economy.

In a procedure also requiring heat application, and thus not completely unlike thermal oxidation of an applied precursor, it is also contemplated to form a suitable barrier layer by chemical vapor deposition method. For this method, there can be utilized a suitable volatile starting material such as one of the organic titanium compounds mentioned herein above with the thermal oxidation procedure, e.g., titanium butyl orthotitanate, titanium ethoxide or titanium propoxide. In this chemical vapor deposition method for obtaining a serviceable barrier layer, the volatile starting material such as one of the organic titanium compounds mentioned hereinabove with the thermal oxidation procedure, e.g., titanium butyl orthotitanate, titanium ethoxide or titanium propoxide. In this chemical vapor deposition method, the volatile starting material can be transported to a suitable roughened surface by an inert carrier gas, including nitrogen, helium, argon, and the like. This compound is transported to a temperature sufficient to oxidize the compound to the corresponding oxide. For application of organic titanium compound, such temperature can be within the range from about 250° C. to about 650° C. As has been discussed hereinbefore with thermal oxidation treatment, it is also suitable to utilize in the chemical vapor deposition procedure a doping compound. Such doping compounds have been discussed hereinabove. For example, a niobium salt may be added to the carrier gas transporting the volatile starting material, or such may be applied to the heated substrate by means of a separate carrier gas stream. As with the thermal oxidation process, this chemical vapor deposition procedure is most particularly contemplated for use following preparation of a suitably prepared roughened surface by etching, or by sharp grit blasting followed by surface treatment, or by melt spraying of metal.

It will be understood that the anode base surface may then proceed through various operations, including pretreatment before coating. For example, the surface may be subjected to a hydriding or nitriding treatment. Prior to coating with an electrochemically active coating, it has been proposed to provide an oxide layer by heating the substrate in air or by anodic oxidation of the substrate as described in U.S. Pat. No. 3,234,110. European Patent Application No. 0,090,425 proposes to platinum electroplate the substrate to which then an oxide of ruthenium, palladium or iridium is chemideposited. Various proposals have also been made in which an outer layer of electrochemically active material is deposited on a sublayer which primarily serves as a protective and conductive intermediate. U.K. Patent 1,344,540 discloses utilizing an electrodeposited layer of cobalt or lead oxide under a ruthenium-titanium oxide or similar active outer layer. Various tin oxide based underlayers are disclosed in U.S. Pat. Nos. 4,272,354, 3,882,002 and 3,950,240. It is also contemplated that the anode base surface may be prepared as with an antipassivation layer.

Following surface treatment, an electrocatalytically active coating can be applied to the valve metal substrate in preparation of the anode base member. As representative of the applied electrochemically active coating, or "surface" coating as such term is used herein, are those provided from platinum or other platinum group metals or they can be represented by active oxide coatings such as platinum group metal oxides, magnetite, ferrite, cobalt spinel or mixed metal oxide coatings. Such coatings have typically been developed for use as anode coatings in the industrial electrochemical industry. They may be water based or solvent based, e.g., using alcohol solvent. Suitable coatings of this type have been generally described in one or more of the U.S. Pat. Nos. 3,265,526, 3,632,498, 3,711,385, and 4,528,084. The mixed metal oxide coatings can often include at least one oxide of a valve metal with an oxide of a platinum group metal including platinum, palladium, rhodium, iridium and ruthenium or mixtures of themselves and with other metals. Further coatings include manganese dioxide, lead dioxide, cobalt oxide, ferric oxide, platinate coatings such as $M_xPt_3O_4$ where M is an alkali metal and x is typically targeted at approximately 0.5, nickel-nickel oxide and nickel plus lanthanide oxides.

The electrocatalytic surface coating may serviceably be an iridium oxide, or the coating will contain an iridium oxide together with tantalum oxide. Also serviceable are those coatings containing an element of ruthenium oxide in combination with titanium oxide itself or with iridium oxide. These coating compositions are well known in the art and have been disclosed such as in U.S. Pat. Nos. 3,632,498, 3,751,296, 3,778,307, 3,840,443 and 3,933,616, and U.S. Pat. Nos. 3,878,083 and 3,926,751.

It is also contemplated that the electrocatalytically active surface coating may contain, in addition to the foregoing coating compositions, tin oxide. Where tin oxide is desired in active surface coating layer, suitable precursor substituents can include $SnCl_4$, $SnSO_4$, or other inorganic tin salts. The tin oxide may be used with doping agents, such as those which would be incorporated as doping agent precursors into the composition to improve conductivity. The normal doping agents for $SnO_2$ are antimony and indium. For example an antimony salt may be used to provide an antimony doping agent in ion form in the oxide lattice. Doping agents suitable for a tin oxide barrier layer include antimony, indium, fluorine, chlorine, molybdenum, tungsten or tantalum. Where a doping agent is utilized, in a tin oxide-containing active layer, the doping agent will typically be present in an amount by weight of from about one percent to about twenty percent doping element as an oxide. A preferred range of doping agent is from about 0.1% percent to about 10% percent, by weight.

Regardless of the coating composition chosen, the preferred coating solution compositions are typically those comprised of $IrCl_3$ with or without $TaCl_5$ and hydrochloric acid, all in aqueous solution. Alcohol based solutions may also be employed. Thus, the iridium chloride can be dissolved in butanol and this mixed with the tantalum chloride dissolved in either isopropanol or butanol, all combined with small additions of hydrochloric acid.

It is contemplated that any of the coating layers utilized herein will be applied by any of those means which are useful for applying a liquid coating composition to a metal substrate. Such methods include dip spin and dip drain techniques, brush application, roller coating and spray application such as electrostatic spray. Moreover, spray application and combination techniques, e.g., dip drain with spray application can be utilized. With the above-mentioned coating compositions for providing an electrochemically active surface coating, a roller coating operation can be most serviceable.

Regardless of the method of application of the coating, conventionally, the foregoing coating procedure is repeated to provide a uniform, more elevated coating weight than achieved by just one coating. By uniform, it is meant that the electrocatalytically active layer will comprise a layer containing a single composition, e.g., a coating derived from $TaCl_5$ and $IrCl_3$ without other metal or metal oxide constituency. Usually, the number of coats for a representative electrochemically active surface coating of a type as mentioned hereinbefore, such as formed by thermal decomposition, will be from about 2 coats to about 25 coats, and will not exceed about 50 coats, and be preferably, for the amount of electrochemically active coating will not exceed 50 grams per square meter ($g/m^2$), basis the platinum group metal content of the coating.

Following any of the foregoing coating procedures, upon separation from the liquid coating composition, the coated metal surface may simply dip drain or be subjected to other post coating technique such as forced air drying. Additionally, the electrocatalytically active coating layer may be cured following coating. Typical curing conditions for electrocatalytic coatings can include cure temperatures of from about 300° C. up to about 600° C. Curing times may vary from only a few minutes for each coating layer up to an hour or more, e.g., a longer cure time after several coating layers have been applied. However, cure procedures duplicating annealing conditions of elevated temperature plus prolonged exposure to such elevated temperature, are generally avoided for economy of operation. In general, the curing technique employed can be any of those that may be used for curing a coating on a metal substrate. Thus, oven curing, including conveyor ovens may be utilized. Moreover, infrared cure techniques can be useful. Preferably for most economical curing, oven curing is used and the cure temperature used for electrocatalytic coatings will be within the range of from about 450° C. to about 550° C. At such temperatures, curing times of only a few minutes, e.g., from about 2 to 10 minutes, will most always be used for each applied coating layer, although longer times of up to about 60 minutes may be utilized.

Subsequent to the formation of the electrocatalytically active surface coating, there can then be formed the topcoating layer. Such topcoating layer, which, as opposed to the surface coating, is not substantially conductive or electrocatalytic, and can be a ceramic material, such as a valve metal oxide, or tin oxide, or mixtures thereof, or an oxide of the type perovskite, garnet or spinel. Where the topcoat is a valve metal oxide, the topcoating layer can be formed from a valve metal alchoxide in an alcohol solvent, with or without the presence of an acid, or salts of the dissolved metals may be utilized. Where valve metal alchoxides are contemplated for use in the present invention, such will include methoxides, ethoxides, isopropoxides and butoxides. For example, titanium butyl orthotitanate, titanium ethoxide, titanium butoxide, titanium propoxide, tantalum ethoxide, or tantalum isopropoxide may be useful. Additionally, salts of the dissolved metals may be utilized, and suitable inorganic substituents can include chlorides, iodides, bromides, sulfates, borates, carbonates, acetates, nitrates and citrates, e.g., $TiCl_3$, $TiCl_4$ or $TaCl_5$, in acid solution. A preferred valve metal oxide topcoating layer is formed from $TaCl_5$ in isopropyl alcohol (IPA) or BuOH.

Where titanium oxide will be utilized, it will generally be a titanium dioxide. However, it is contemplated that titanium suboxide can be useful, i.e., $TiO_x$ where x is a number between 1.5 and 1.999. It is also contemplated that valve metal oxide may be used with doping agents, such as those which would be incorporated as doping agent precursors into the composition to increase the conductivity of the resulting valve metal oxide layer. For example a niobium salt may be used to provide a niobium doping agent in ion form in the oxide lattice. Other doping agents include the platinum group metals, ruthenium, iridium, platinum, rhodium and palladium, or non-platinum group metals including Ta, Zr, Mo, W, Re, and Bi, as well as mixtures of any of the doping agents. Such doping agent for the valve metal oxide may typically be present in an amount from about 0.1% to about 10%, by weight.

In addition to the use of valve metal oxide topcoats, it is further contemplated that other ceramic materials could be applied as the topcoat to effect reduction in the consumption of organic substituents in electroplating solutions. Thus, it is contemplated that spinels, garnets, glasses, and perovskites, among others that are resistant to attack in the electrolyte, could be applied as topcoats over an electrocatalytically active coating. Spinels are represented by the formula $AB_2O_4$ where A is one or more of a divalent metal ion such as magnesium, iron, nickel, manganese and/or zinc; and B represents trivalent metal ions such as aluminum, iron, chromium and/or manganese. Titanium may also occupy this site with a $4^+$ charge and lead at $2^+$ can occupy this site. Examples of spinels include $MgAl_2O_4$, $Fe_2MnO_4$, $Al_2FeO_4$, and $Al_2ZnO_4$, and the like. Garnets are represented by the general formula $A_3B_2(SiO_4)_3$, where A is one or more of divalent metals such as calcium, iron, magnesium and/or manganese, and B is one or more of trivalent metals such as aluminum, chromium, iron and/or manganese and in the rarer garnets; vanadium, titanium, zirconium and/or silicon. Perovskites are represented by the general formula $ABO_3$ where A is a mono or divalent cation (metal) and B is a tetravalent or pentavalent cation (metal). Examples include $CaTiO_3$, $BaTiO_3$, $LaCoO_3$, $YAlO_3$, and the like.

As mentioned hereinbefore, it is also contemplated that the topcoating layer may be a tin oxide layer. Where tin oxide is the desired topcoating layer, suitable precursor substituents can include $SnCl_2$, $SnSO_2$, or other inorganic tin salts. The tin oxide may be used with doping agents such as those which would be incorporated as doping agent precursors into the composition to improve conductivity. Doping agents suitable for a tin oxide topcoat layer include antimony, indium, fluorine, chlorine, molybdenum, tungsten, or tantalum. Where a doping agent is utilized, in a tin oxide topcoating layer, the doping agent will typically be present in an amount by weight from about one percent to about 20 percent doping element as an oxide.

The valve metal oxide or tin oxide topcoat may be applied in any manner as hereinbefore described with respect to the first electrochemically active coating layer. Topcoats in the form of a perovskite or a spinel may also be applied via thermal decomposition. Where a garnet topcoat is utilized, it will generally be applied via a thermal spray technique, which technique is also suitable for perovskites and spinels. Additionally, in a procedure also requiring heat application, and thus not completely unlike thermal oxidation of an applied precursor, it is also contemplated to form a suitable valve metal oxide layer by a chemical vapor deposition method. For this method, there can be utilized a suitable volatile starting/material such as one of the organic titanium compounds mentioned hereinabove with the thermal oxidation procedure, e.g., titanium butyl orthotitanate, titanium ethoxide or titanium propoxide. In this chemical vapor deposition method for obtaining a valve metal oxide layer, the volatile starting material can be transported to a suitably prepared roughened and coated surface by an inert carrier gas, including nitrogen, helium, argon, and the like. This compound is transported to a heated substrate which is heated to a temperature sufficient to oxidize the compound to the corresponding oxide. For application of organic titanium compound, such temperature can be within the range from about 250° C. to about 650° C. As has been discussed hereinbefore with thermal oxidation treatment, it is also suitable to utilize in the chemical vapor deposition procedure a doping compound. Such doping compounds have been discussed hereinabove. For example, a volatile niobium compound may be added to the carrier gas transporting the volatile starting material, or such may be applied to the heated substrate by means of a separate carrier gas stream.

Following application of the topcoating layer such as of valve metal oxide precursor(s), the topcoating layer may then proceed through thermal treatment. Where salts of the valve metals are utilized, this thermal treatment may be as by thermal oxidation of the valve metal salts applied to the first electrochemically active coating layer. Thermal treatment will generally be conducted in an oxygen containing environment, preferably air for economy, by heating at a temperature within the range of from greater than about 250° C. up to about 700° C. For efficient thermal conversion, a preferred heating temperature will be in the range of from about 300° C. to about 600° C. Where the coating is applied as a liquid medium, such thermal treatment will serviceably be observed after each applied coating with such temperature being maintained from about 1 minute to about 60 minutes per coat. However, it is within the concept of the present invention that thermal treatment could occur after a successive number of coating cycles have occurred. Preferably, for efficiency and economy, the temperature will be maintained from about 3 to about 10 minutes per coat. The number of coating cycles can vary but most typically the required amount of valve metal oxide layer will be from about 6 to about 20 coats.

Usually, the number of coats for a representative valve metal oxide coating, such as formed by the thermal decomposition of titanium butyl orthotitanate, will not exceed on the order of about 30, and advantageously for economy will not exceed about 20. However, a plurality of layers may be applied to the electrochemically active coating layer so as to provide the desired loading of valve metal oxide coating, i.e., from about 10 to about 20 layers.

It will be understood that, regardless of the manner of application of the topcoating or subsequent treatment of the topcoating following application, the topcoating will be a porous coating. In this regard, by "porous" it is meant that the coating contains microcracks, channels or holes (pores), including combinations thereof, e.g. microcracks and pores, that allow access of at least a portion of the electrolyte, at a controlled rate, to the underlying electrocatalytic coating. While not intending to limit the invention, the speculation is that the operative feature of the porous topcoat is to inhibit the access of certain species in the electrolyte to the electrocatalytic surface, thus preventing their oxidation. This could take the form of a steric hindrance such that larger molecules (e.g. organics), complexes or clusters will not readily penetrate the pores in the coating to the actual electrocatalytic surface. Alternatively, the topcoat could limit the exposed surface area of the electrocatalytic coating such that the rate of oxidation of a species is decreased, i.e. the limiting current for that reaction is well-exceeded. This porosity may be inherent in the coating itself, or can be enhanced by the addition of various substituents. Thus, it is contemplated to add so-called "pore formers" to the valve metal oxide topcoating. These pore formers can be inorganic compounds that are insoluble in the topcoating solution, thermally stable to the cure temperature, and subsequently leachable from the coating. Such pore formers include, among others, fine particles of carbonates (such as $Na_2CO_3$), alumina ($Al_2O_3$), silica ($SiO_2$), silicates, and the like. Additionally, organic compounds could be added to the topcoating solution which subsequently decompose during the thermal oxidation, leaving a porous coating. Such organic compounds could include polymers, such as polyethylene or polypropylene beads, polyethylene glycol, polycarbonate, polyesters, and the like. Where such a pore former is utilized, it will generally be present in an amount from about 0.1 to about 20% by weight of the total coating composition.

Figure 1:
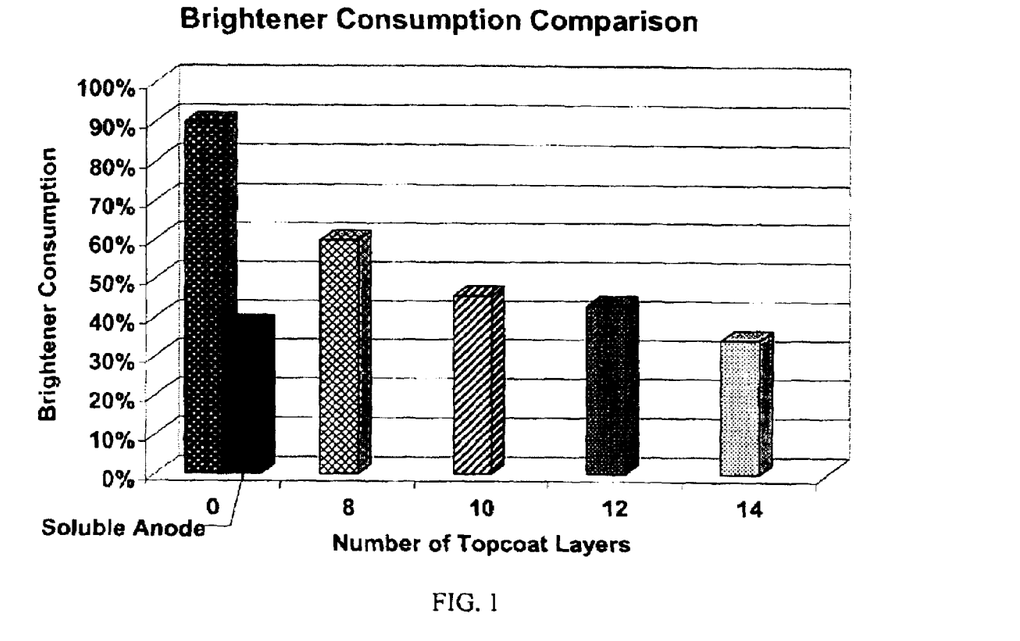
FIG. 1 is a graph illustrating the amount of organic additive consumed in a plating bath.

Referring, then, to FIG. 1, there is illustrated a graphic representation of the amount of consumption of an organic brightener during a standard plating test for plating anodes having an electrocatalytic coating with no topcoat, and with different numbers of layers of topcoat. As can be seen, the plating anodes having topcoat applications consumed significantly reduced amounts of additive, becoming equivalent to soluble anodes that are the standard anode in many plating systems.

While the foregoing discussion has been directed to the use of ceramic material topcoats for the reduction in consumption of organic constituents in electroplating solutions, it has also been found that the topcoat can be useful in decreasing the oxidation of other low level constituents of an electroplating solution, such as chloride, iodide, bromide, ferrous ion and stannous ion. Thus, it is contemplated that the topcoats of the present invention may find utility in cathodic protection systems, chrome plating systems, electroplating, electrowinning, metal recovery, water treatment, oxygen generation (e.g. water oxygenation), so-called "functional water", i.e. acid and alkali streams for disinfecting, seawater electrolysis, water electrolysis (e.g. production of $H_2$ and $O_2$), salt splitting (e.g. recovery of $H_2SO_4$ and NaOH from $Na_2SO_4$) or any electrochemical system which contains low levels of chloride or other oxidizable species and for which it is desirable to limit the generation of oxidative products (e.g. chlorine species). Such topcoated anodes can serve as either the sole or principal anode as well as for use as auxiliary anodes.

The following examples, unless otherwise noted as comparative examples, generally demonstrate the protection of an electrolyte constituent from oxidation by a valve metal oxide topcoating in an electrochemical cell:

EXAMPLE 1

Expanded and flattened mesh of grade 1 titanium was provided for test purposes. The titanium mesh was etched in 18-20% HCl at about 95° C. to clean and roughen the surface.

The titanium mesh etched surface was provided with a commercial, electrochemically active oxide coating of Ir Oxide/Tantalum Oxide in a mole ratio (metals basis) of 75:25 using $IrCl_3$ and $TaCl_5$ in n-butanol with a small amount of HCl. The sample plate was coated using a hand roller.

The coated mesh was then topcoated with a tantalum oxide coating. The coating solution composition was 50 gpl Ta (as $TaCl_5$) in isopropanol. The coating was applied in layers, each layer being dried at room temperature and then baked at 515° C. for seven minutes. Samples were prepared with a hand roller to a total of 8, 10, 12 and 14 coating layers A sample with no topcoat was used as a comparison sample, as was a sample of copper material ("soluble anode"), which represents the anode presently used in many plating applications.

The pieces of the prepared anodes were cut to a size of 6.4×10 cm and then tested as an anode in a standardized copper plating bath with the addition of commercial organic brighteners. The copper plating solution was prepared using 65.5 grams per liter of copper (as copper sulfate), 230 grams per liter sulfuric acid, and 60 ppm chloride (as NaCl). A standard, commercially available brightener was added to an initial concentration of 5.0 ml/l along with the required carrier at a concentration of 10 ml/l.

The solution was placed in a 1 liter vessel along with a brass cathode (6.4×7.6 cm, with a small tab extending above the surface for electrical connection). The anode was immersed to a depth of 7.6 cm. A d.c. current was applied to achieve a current density of 16 $mA/cm^2$ (milliamps per square centimeter). The test was operated for one hour. Residual brightener concentration (and thus the amount of consumption) was determined using an ECI Technology Quali-lab QL-10 analyzer using the Modified Linear Approximation Technique (MLAT).

The results are compiled in Table I and illustrated in FIG. 1. As can be seen from the data, the addition of the topcoats significantly reduced the amount of brightener consumption to a level equivalent to a soluble copper anode.

TABLE I

Comparison of the Amount of Organic Brightener Consumption for Samples Prepared in Example 1

| Number of Topcoat Layers | Organic Brightener Consumption |
| --- | --- |
| 0 | 90% |
| 8 | 60% |
| 10 | 46% |
| 12 | 43% |
| 14 | 34% |
| Soluble Anode | 38% |

EXAMPLE 2

A non-separated cell was utilized to measure the hypochlorite generated from dilute NaCl solutions (2 and 28 gpl) using Ir oxide/Tantalum oxide coated titanium anodes with and without topcoats. The cathode was stainless steel (25-6Mo). The applied anodic current density was 1.25 kA/m$^2$ (kiloamps per square meter) and the electrolyte temperature was about 25° C. One anode sample had only the $IrO_2/Ta_2O_5$ electrocatalytic coating while the other had an additional 20 layers of tantalum oxide topcoat. The Ta oxide layers were applied from a solution of $TaCl_5$ in n-butanol (50 gpl Ta). Each coat was dried at 100-110° C. for three minutes and then cured at 525° C. for 7 minutes. A total of 20 layers were applied. The current efficiencies for hypochlorite generation are shown in Table II for anodes with and without tantalum topcoats.

TABLE II

| Anode | Current Efficiency in 2 gpl NaCl | Current Efficiency in 28 gpl NaCl |
|---|---|---|
| No Topcoat | 43% | 63% |
| Topcoat | 21% | 31% |

The presence of the topcoats is seen to cut the current efficiency for hypochlorite generation by more than one-half, indicating that significantly less chloride was oxidized at the anode.

EXAMPLE 3

Samples of the mesh as prepared in Example 1 with 10 and 12 Ta topcoats were measured via cyclic voltammetry (a standard electrochemical technique) to demonstrate the inhibiting effect of the topcoat on chloride oxidation. As a comparative example, a sample was prepared as in Example 1 except that no topcoats of Ta oxide were applied.

Figure 2:
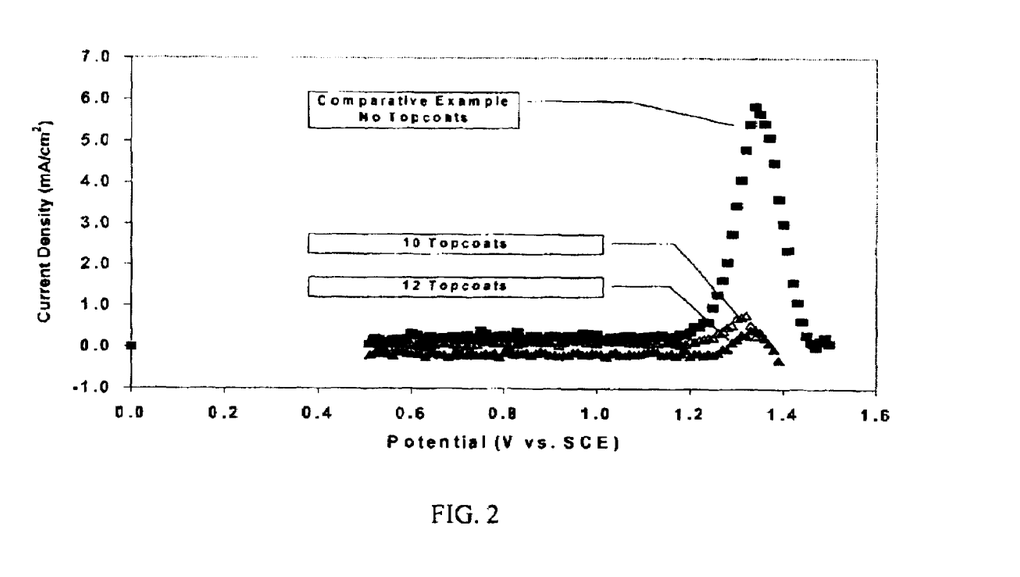
FIG. 2 is a cyclic voltammogram illustrating the effects of the coating of the present invention on the oxidation of chloride in an electrolytic cell.

To perform the cyclic voltammetry measurements, a solution of 150 gpl $H_2SO_4$ was prepared. To a portion of this solution sodium chloride (NaCl) was added to a concentration of 25 millimolar. A cyclic voltammogram was run first in the $H_2SO_4$ solution only and then in the solution containing the NaCl. The voltammograms were measured at room temperature with a scan rate of 200 mV/sec from 0.5 V to 1.5 V vs. SCE. The voltammogram for the $H_2SO_4$ solution was then digitally subtracted from that of the NaCl solution to remove background effects and produce a net voltammogram for the oxidation of chloride to chlorine. The net voltammograms for Example 3 and Comparative Example 3 are shown in FIG. 2. The oxidation of chloride ion is substantially reduced (very low peak heights) for the present invention. Measuring actual peak heights indicates the amount of oxidation was reduced by a factor of 21.

Figure 2: Cyclic Voltammogram Showing Decreased Chloride Oxidation

EXAMPLE 4

Samples of mesh were coated as in Example 1 with a Ta/Ir oxide electrocatalytic layer over which was applied 8 coats of a tantalum oxide only layer.

Comparative example 4 was prepared as in Example 1 except no tantalum oxide-only layer was applied over the electrocatalytically active coating.

Portions measuring approximately 7.8 cm$^2$ in area for both Example 4 and Comparative Example 4 were examined by cyclic voltammetry. The electrolytes were first 150 gpl $H_2SO_4$ and then 150 gpl $H_2SO_4$ containing 0.025 M Ferrous Sulfate (FeSO$_4$). All measurements were at room temperature using a Saturated Calomel Electrode (SCE) as the reference electrode. A voltage sweep was performed from 0.0 V vs. SCE to 1.0 V vs SCE and then back to 0.0 V vs. SCE at a sweep rate of 100 mV/sec. The curve for the $H_2SO_4$ solution was digitally subtracted (to remove background effects) from the curve done with FeSO$_4$. The results are provided in FIG. 3, which shows the expected oxidation peak for Ferrous to Ferric ion (and the subsequent reduction of the produced Ferric) for the comparative example. The sample for Example 4 with the topcoat layer shows substantially no oxidation peak for ferrous indicating that the topcoat inhibits the oxidation of the ferrous ion.

Figure 3:
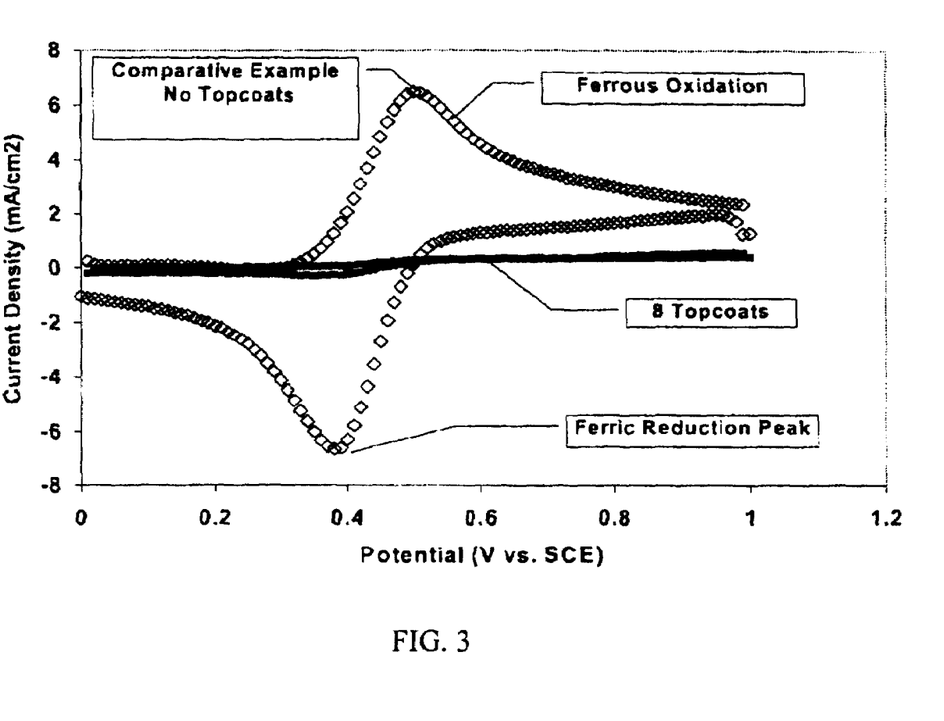
FIG. 3 is a cyclic voltammogram illustrating the effects of the coating of the present invention on the oxidation of ferrous ion in an electrolytic cell.

Figure 3: Cyclic Voltammogram Showing Inhibition of Ferrous Oxidation

The invention has been described with reference to the preferred embodiment. Modifications and alterations will occur to others upon a reading and understanding of the specification. It is intended by Applicants to include all such modifications and alterations insofar as they come within the scope of the appended claims or the equivalents thereof.

What is claimed is:

1. A process for the electroplating of a metal from an electrolyte solution in an electrolytic cell having at least one anode therein, said anode having an electrocatalytic surface coating on an anode base, and wherein said electrolytic solution contains an organic substituent, said process comprising:
   (a) forming a topcoat over the entire surface of said surface coating wherein said topcoat is one or more of a valve metal oxide, a tin oxide or combinations thereof, an oxide of the type perovskite, garnet or a glass; and
   (b) operating said anode in said cell such that the consumption of said organic substituent is reduced while maintaining anode potential in said cell.

2. A process according to claim 1, wherein said anode base is a valve metal anode base, said valve metal is selected from the group consisting of titanium, tantalum, zirconium, niobium, tungsten, aluminum, their alloys and intermetallic mixtures, and said base is in mesh, sheet, blade, tube or wire form.

3. A process according to claim 2, wherein a surface of said valve metal anode base is a prepared surface.

4. A process according to claim 3, wherein said surface is prepared as by one or more of intergranlular etching, grit blasting, or thermal spraying.

5. A process according to claim 3, wherein there is established a ceramic oxide barrier layer as a pretreatment layer on said prepared surface.

6. A process according to claim 2, wherein said surface coating consists essentially of platinum group metal or metal oxides, magnetite, ferrite, cobalt oxide spinel, tin oxide, and antimony oxide, and/or contains a mixed crystal material of at least one oxide of a valve metal and at least one oxide of a platinum group metal, and/or contains one or more of manganese dioxide, lead dioxide, palatinate substituent, nickel-nickel oxide or a mixture of nickel plus lanthanum oxides.

7. A process according to claim 6, wherein said top coat is a valve metal oxide coating layer and said valve metal oxide is selected from the group consisting of titanium, tantalum, niobium, zirconium, molybdenum, aluminum, hafnium, or tungsten or mixtures thereof.

8. A process according to claim 6, wherein said top coat is a tin oxide coating layer doped with one or more of Sb, F, Cl, Mo, W, Ta, Ru, Ir, Pt, Rh, Pd, or In and oxides thereof, and said doping agent is in an amount in the range of from about 0.1% to about 20%.

9. A process according to claim 6, wherein said topcoat is one or more of spinels, garnets, glasses, and perovskites.

10. A process according to claim 1, wherein said anode is an oxygen-evolving anode.

11. A process according to claim 1, wherein said metal in said electrolyte solution is copper, nickel, zinc or tin.

12. A process according to claim 1, wherein said metal of said anode base is titanium, said electrocatalytic surface coating is iridium oxide, with or without tantalum oxide, and said topcoat is tantalum oxide formed from $TaCl_5$ in IPA or BuOH.

13. A process according to claim 1, wherein said metal of said anode base is titanium, said electrocatalytic surface coating is iridium oxide, with or without tantalum oxide, and said topcoat is titanium oxide formed from titanium butoxide in BuOH.

14. A process for the electrolysis of an electrolyte containing two or more oxidizable species and that is contained in an electrolytic cell, said cell having therein at least one anode having a valve metal base, said process comprising:
   providing an electrolytic cell;
   establishing in said cell an electrolyte containing two or more oxidizable species;
   providing an anode in said cell in contact with said electrolyte which anode has a valve metal base and an electrocatalytic surface coating thereon,
   and wherein there is provided a topcoat of a ceramic material covering at least substantially the entire surface of said electrocatalytic coating wherein said ceramic material is one or more of a valve metal oxide, a tin oxide or combinations thereof, an oxide of the type perovskite or garnet or a glass;
   impressing an electric current on said anode;
   conducting the electroysis of said electrolyte;
   whereby said process reduces the oxidation of at least one of said oxidizable species.

15. A process according to claim 14, wherein said cell is a separated cell or an unseparated cell.

16. A process according to claim 15, wherein said oxidizable species is one or more of chloride, bromide, iodide, ferrous ion and stannous ion.

17. A process according to claim 15, wherein electrocatalytic surface coating consists essentially of platinum group metal or metal oxides, magnetite, ferrite, cobalt oxide spinel, tin oxide, and antimony oxide, and/or contains a mixed crystal material of at least one oxide of a valve metal and at least one oxide of a platinum group metal, and/or contains one or more of manganese dioxide, lead dioxide, palatinate substituent, nickel-nickel oxide or a mixture of nickel plus lanthanum oxides.

18. A process according to claim 17, wherein said valve metal oxide is tantalum oxide or titanium oxide or mixtures thereof.

19. A process according to claim 15, wherein said cell is an unseparated cell and said process is one or more of electrowinning, cathodic protection, copper foil deposition, chrome plating, electroplating, metal recovery, water treatment, oxygen generation, and seawater electrolysis.

20. A process according to claim 15, wherein said cell is a separated cell and said process is one or more of chlor-alkali, salt splitting, hypochlorite production, or water electrolysis.

21. A process according to claim 15, wherein said process further comprises the step of heating said topcoat of said ceramic material and said heating is by baking at a temperature of from about 250° C. to about 700° C.

22. A process according to claim 14, wherein said valve metal base of said anode is one or more of titanium, tantalum, zirconium, aluminum, tungsten, their alloys and intermetallic mixtures thereof, and said valve metal base is in mesh, sheet, blade, tube, or wire form.

23. A process according to claim 22, wherein a surface of said valve metal anode base is a prepared surface.

24. A process according to claim 23, wherein said surface is prepared as by one or more of intergranlular etching, grit blasting, or thermal spraying.

25. A process according to claim 23, wherein there is established a ceramic oxide barrier layer as a pretreatment layer on said roughened surface.

26. A process according to claim 25, wherein said ceramic material comprises one or more of an oxide of the type perovskite or garnet.

27. A process according to claim 25, wherein said ceramic material is tin oxide.

28. A process according to claim 14, wherein said ceramic material is a valve metal oxide and said valve metal oxide is selected from the group consisting of titanium, zirconium, niobium, tantalum, aluminum, tungsten, their alloys and intermetallic mixtures.

29. A process according to claim 14, wherein said valve metal oxide is applied in an amount from about 6 to about 20 layers.

\* \* \* \* \*